(12) United States Patent
Drees et al.

(10) Patent No.: US 8,423,634 B2
(45) Date of Patent: Apr. 16, 2013

(54) SYSTEM AND METHOD FOR DETERMINING COST OF WEBSITE PERFORMANCE

(75) Inventors: Timothy P. Drees, Del Mar, CA (US);
Stella V. Zimmerman, La Mesa, CA (US); Doug J. Taylor, Solana Beach, CA (US); Lenny Rachitsky, San Diego, CA (US)

(73) Assignee: Neustar, Inc., Sterling, VA (US)

( * ) Notice: Subject to any disclaimer, the term of this patent is extended or adjusted under 35 U.S.C. 154(b) by 1369 days.

(21) Appl. No.: 11/136,086

(22) Filed: May 24, 2005

(65) Prior Publication Data

US 2005/0262240 A1 Nov. 24, 2005

Related U.S. Application Data

(60) Provisional application No. 60/573,873, filed on May 24, 2004.

(51) Int. Cl.
*G06F 15/173* (2006.01)

(52) U.S. Cl.
USPC .......................................................... 709/224

(58) Field of Classification Search .................. 715/745; 709/250, 202, 223, 224; 705/56, 400, 1
See application file for complete search history.

(56) References Cited

U.S. PATENT DOCUMENTS

| | | | | |
|---|---|---|---|---|
| 5,850,388 A * | 12/1998 | Anderson et al. | ............. | 370/252 |
| 6,381,635 B1 * | 4/2002 | Hoyer et al. | ................... | 709/207 |
| 6,618,046 B1 * | 9/2003 | Srinivasa et al. | .............. | 345/418 |
| 7,577,701 B1 * | 8/2009 | Johns et al. | ..................... | 709/203 |
| 2003/0079160 A1 * | 4/2003 | McGee et al. | ................... | 714/39 |

* cited by examiner

*Primary Examiner* — Larry Donaghue
(74) *Attorney, Agent, or Firm* — Procopio, Cory, Hargreaves & Savitch LLP; Pattric J. Rawlins (57) ABSTRACT

A system and method for visually and mathematically correlating website performance datasets with analytics datasets and optionally with back end application performance datasets in order to determine if variations in one dataset are caused by or related to variations in another dataset and simultaneously determines the cost of slow or unavailable websites by comparing expected traffic to actual traffic during the slow or errant period.

17 Claims, 10 Drawing Sheets

SYSTEM AND METHOD FOR DETERMINING COST OF WEBSITE PERFORMANCE

RELATED APPLICATION

The present application claims the benefit of U.S. provisional patent application Ser. No. 60/573,873 filed on May 24, 2004, which is incorporated herein by reference in its entirety.

BACKGROUND

1. Field of the Invention

The present invention generally relates to the internet/website field and more specifically relates to measuring the speed and reliability of the delivery of websites to end users (website performance monitoring); quantifying how many visitors a website receives, what pages they visit on a website, and the monetary value of each user visit (website analytics monitoring); and the general health of the applications which the website runs (application health monitoring).

2. Related Art

Conventional website performance monitoring solutions address the need for web enabled businesses to measure the speed and reliability of their websites as seen by a global audience accessing them over the internet. Conventional website analytics monitoring solutions address the need for web enabled businesses to understand how much traffic they are getting and the end users' behavior once they arrive at the website. These conventional systems may also calculate how much money a website generates by tracking the value of purchases via the website.

Conventional back end application health monitoring solutions address the need for web enabled businesses to understand how well their shrink-wrapped back end applications are standing up to day to day load levels. Each back end application has its own metrics that need to be monitored, for example one would monitor CPU, Memory or Swap space usage on Linux or Windows Operating System applications. Another example would be monitoring the memory usage or requests per second of the Oracle database application.

These conventional disparate systems lack the ability to correlate the cause and effect of website performance, website analytics and application health on each other. These conventional disparate systems generate data results that reflect what is specifically measured by the particular system, leaving the website owner to make sense of the disparate data results generated by the disparate systems. These conventional disparate systems lack the ability to draw intelligent conclusions about the cause and effect relationships. Since these conventional systems can not determine the cause and effect relationship between each other, they also can not determine the cost of website performance slowdowns or back and application health to the website owner. Therefore what is needed is a system and method that overcomes these significant problems found in the conventional systems as described above.

SUMMARY

Accordingly, presented herein are systems and methods for correlating website performance data (namely, how fast pages are delivered around the world and error rates) with analytics data (how often the website is visited, what pages, by whom, and when) and with back end application performance data (Operating system software, Database software health, web server software health etc.) in order to determine the cause of one metric on another for problem analysis. Note that one of the three datasets can be missing (from website performance data, analytics data and application health data) and the systems and methods maintain functionality and validity.

Additionally presented herein are systems and methods that provide the ability to determine the cost of website slowness to the business by maintaining historical analytics data (traffic and revenue made or saved by the website) and comparing that to analytics data during times of slowness.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a system and method for correlating website performance monitoring data, web analytics monitoring data and application health monitoring data in order to visually compare and draw intelligent conclusions on the effect of one dataset to another. In addition the invention provides the ability to determine the cost of a slow performing website to the business by first determining from performance data when the website was slow, then comparing that to the analytics data (visitor traffic and website revenue) during the slow period and comparing it against historical analytics information (what the site normally received in visitor traffic and website revenue).

Website slowness may be caused by large amounts of visitor traffic. A large drop off in visitor traffic may be caused by a slow website which itself might be slow due to poor application health. A slow website might be caused by a spike in visitor traffic which might cause poor application health. A slow website, but good application health, indicates the problem is related not to any of the gathered metrics which indicates the problem is within the interconnectivity of the system (the network). During a period of slowness, using forecasted traffic and revenue levels, this invention will be able to determine the cost of that slowness on the business.

Figure 1:
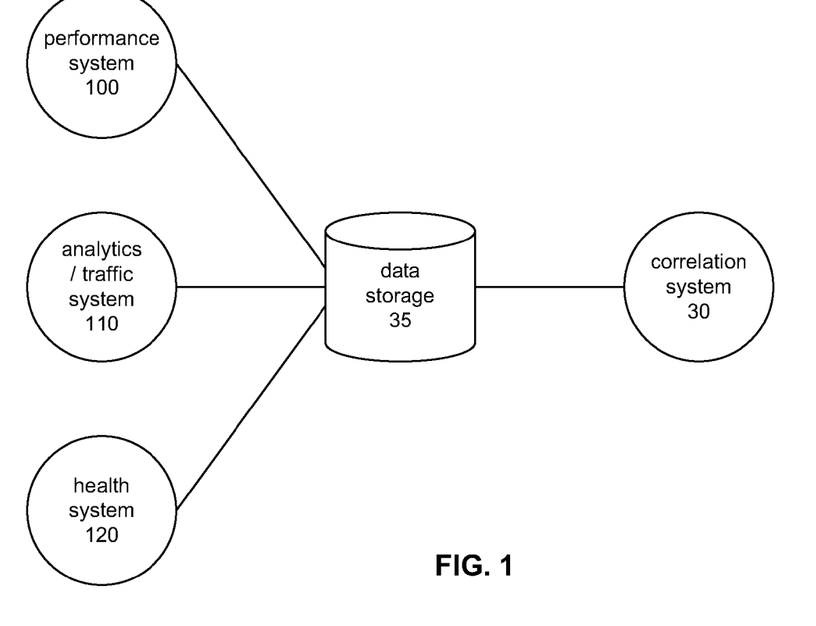
FIG. 1 is a block diagram showing an example system for collecting and accessing monitored data according to an embodiment of the present invention.

FIG. 1 is a block diagram illustrating an example architecture in a system for collecting data from the three disparate monitoring systems (100, 110 and 120) and combined in a database 50 with a correlation system providing the analysis according to an embodiment of this invention. The three systems are website performance monitoring system 100, web analytics/traffic monitoring system 110 and application health monitoring system 120. The correlation system 130 also has access to the database 50 for intelligent analysis and reporting purposes.

Figure 2:
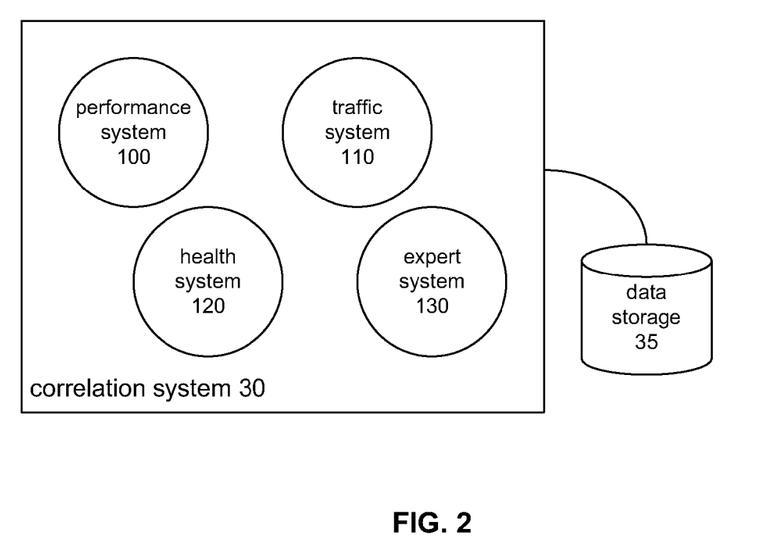
FIG. 2 is a block diagram illustrating an example correlation system according to an embodiment of the present invention.

FIG. 2 is block diagram illustrating an example correlation system 30 according to an embodiment of the present invention. In the illustrated embodiment, the correlation system 30 comprises a performance system 100, an analytics system 110, a health system 120 and an expert system 130. As can be seen between FIGS. 1 and 2, the various components of the system can be implemented separately or combined together in a single server computer machine.

Figure 3:
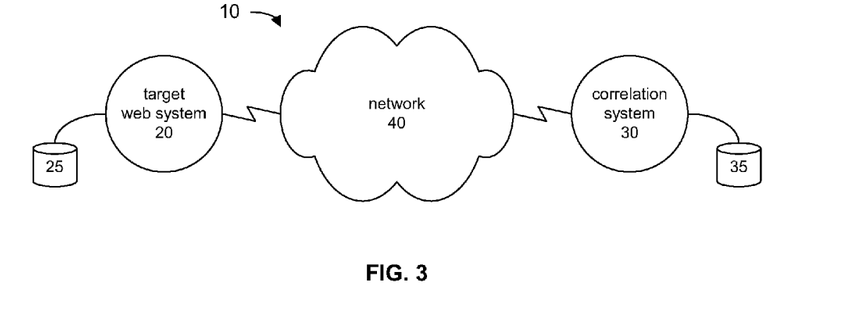
FIG. 3 is a network diagram showing an example network connecting a target web system and a correlation system through a network according to an embodiment of the present invention.

FIG. 3 is a network diagram of a system 10 for correlation according to an embodiment of the present invention. In the illustrated embodiment, the system comprises a web system 20 communicatively coupled to a correlation system 30 via a network 40. The web system 20 is configured with a data storage area 25 and the correlation system 30 is similarly configured with a data storage area 35. The network 40 may be a local area network ("LAN"), a wide area network ("WAN"), a private network, a public network, or a combination of networks such as the Internet. The data storage areas 25 and 35 can be any type of volatile or persistent data storage device such as a hard disk drive or random access memory. Small software agents 400 can optionally be installed in the target web system 20 to provide application health information.

The target web system 20 can be any of a variety of conventional web servers that typically store a plurality of web pages and provide those pages to browser applications upon request. In addition it can contain a variety of conventional application servers that typically provide intelligence to such websites and drive any web based applications. The web system 20 preferably contains one or more database servers which contain data storage 25.

The correlation system 30 runs on a conventional server and accesses storage 35 which comprises data gathered from the three monitoring systems 100, 110, and 120. The correlation system 30 comprises an expert system 130 which analyzes the data in order to generate visual representations of the data and to provide a textual human readable analysis of any conclusions or discoveries drawn by the expert system.

Figure 4:
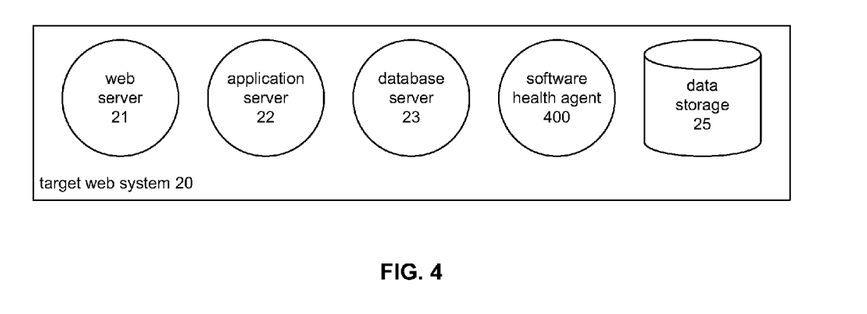
FIG. 4 is a block diagram showing the components which make up an example target web system according to an embodiment of the present invention.

FIG. 4 is a block diagram showing the components which make up a typical target web system 20. A web system 20 can comprise any number of web servers 21, optional application servers 22 and optional database servers 23. The database server 23 is in turn connected to data storage 25. A web request is first handled by the webserver 21, if the request is for a static document, the webserver 21 handles the request. If the user is interacting with a web based application such as an online store, the activity is often handled by one or more application servers 22 which may rely on one or more database servers 23. If the website owner wishes to monitor the health of any of the applications that run on these servers then optional software health agents 400 are installed.

Figure 5:
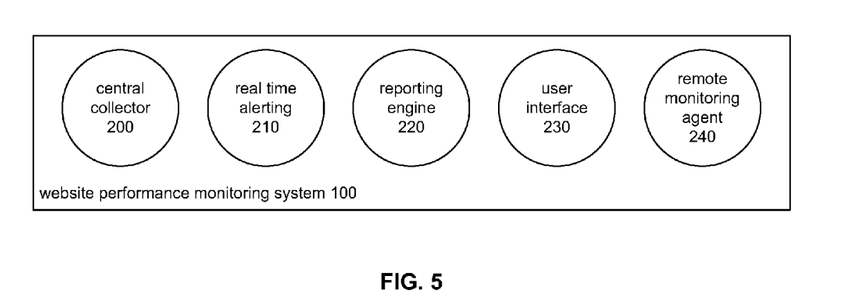
FIG. 5 is a block diagram showing the components which make up an example website performance monitoring system according to an embodiment of the present invention.

FIG. 5 is a block diagram showing the components which make up a Website Performance Monitoring System 100. A website performance monitoring system 100 comprises a central controller 200 which gathers data from one or more remote monitoring agents 240 which are placed in various locations around the world and communicatively coupled over a network 40. Both the controller 200 and the remote monitoring agents 240 run on conventional servers and are connected through a network 40. Data is gathered constantly in real time into controller 200 which processes the information to determine if the website performance data exceeds predefined thresholds, if so, real time alerts 210 are triggered. Periodic reports are generating from a reporting engine 220 to provide visual analysis of website performance data. A user interface 230 is available to make settings changes for how, when and where target websites are monitored from and to generate web based real time reports. One or more remote monitoring agents 240 comprise a server with a web browser such as Internet Explorer. The browser is instructed what website to visit over a network 40 and to record how long it takes for the website to come up or if any errors occur. Additionally, the browser can be instructed to simulate user interactions, such as simulating multiple steps at a website—i.e., 1) Homepage, 2) Login with predefined username, 3) Click on Logout—and the remote monitoring agent 240 will record the web page load times of each step or any errors that occur.

Figure 6:
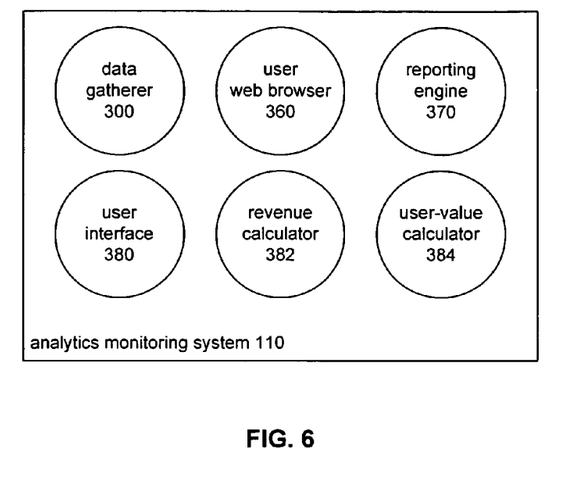
FIG. 6 is a block diagram showing the components which make up an example analytics monitoring system according to an embodiment of the present invention.

FIG. 6 is a block diagram showing the components which make up an analytics monitoring system 110. An analytics monitoring system 110 comprises a central data gatherer 300 which gathers data from one or more user web browsers 360 (i.e. Internet Explorer) over a network 40. Due to design of the web pages delivered by the target web system 20, when the user visits the website, a small communication is sent from the user's web browser 360 to the central data gatherer 300 over a network 40. Data is gathered constantly in real time into gatherer 300 which processes the information to determine if the analytics data (i.e., traffic data) exceeds predefined thresholds, if so, real time alerts are triggered. Periodic reports are generated from a reporting engine 370 to provide data results and visual analysis of website performance data. A user interface 380 is available to change settings of thresholds or to generate real-time reports.

A revenue calculator 382 is often used to calculate how much money a website generates in a certain time period. Revenue calculation can be incorporated into a web analytics solution that calculates the direct revenue a website generates by recording the amount of money put into shopping carts or other aggregation methods. A user-value calculator 384 can be used in place of a revenue calculator when a website generates little or no revenue directly, yet there is still a value of each user at the website. A user interface component asks the web analytics user to specify the value of a visit or the value of a transaction of a visit when the website itself generates insignificant revenue but the value of a user is still important.

Figure 7:
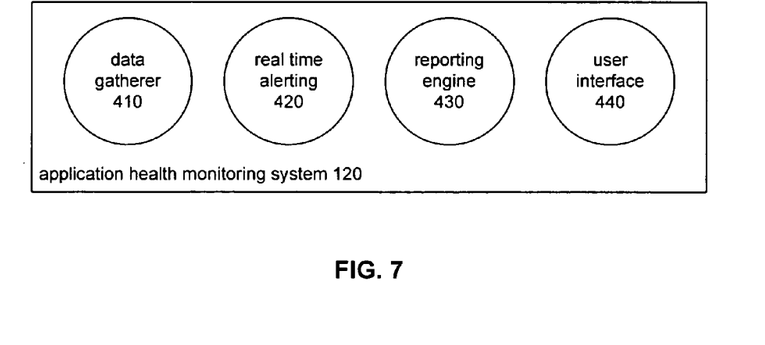
FIG. 7 is a block diagram showing the components which make up an example application health monitoring system according to an embodiment of the present invention.

FIG. 7 is a block diagram showing the components which make up an application health monitoring system 120. A health data gatherer 410 communicates over a network 40 with software health agents installed on a target web system 20 server. These software health agents communicate directly with the various back end applications such as the Windows or Linux operating systems, Oracle database, Broadvision or any other back end application. The information from the software health agents is communicated back to the health data gatherer 410. The real time alerting module 420 checks against pre-defined performance thresholds and send out any real time alerts if necessary. Periodic reports are generated from a reporting engine 370 to provide data results and visual analysis of website performance data. A user interface 380 is available to change settings of thresholds or to generate real-time reports.

Figure 8:
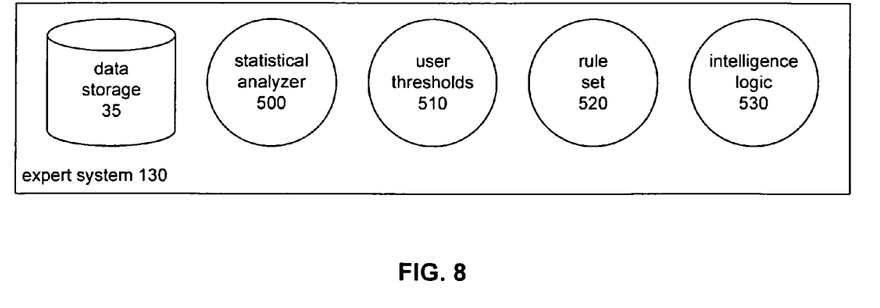
FIG. 8 is a block diagram showing the components which make up an example expert system according to an embodiment of the present invention.

FIG. 8 is a block diagram showing the components which make up an expert system 130. An expert system is a system which has built in intelligence on a particular subject, in this case the cause and effect of one entity on another. In this case the three entities are web analytics (website traffic/revenue) data, website performance data and application health data. The expert system 130 starts with a database of information gathered from the three systems 100, 110, and 120. It then performs analysis 500 on the data in order to determine patterns, averages, variations from norm, spikes and historical comparisons. In addition in the process of analysis 500, the data is collated into time periods or buckets for comparing data in identical time periods. The data is then compared against user defined thresholds 510 to determine if the data is worthy of further analysis; in other words if there are no variations and everything is normal, there is no reason to provide further analysis. If further analysis is determined valuable, a series of intelligent algorithms with logic 530 use a rule set 520 on the analyzed data to determine correlations between variations in one set of data compared to another. This intelligence will be able to determine if a variation in one data set was caused by another or if the two events are distinct. This same logic 530 will have the ability to determine the cost to the business of a slow or errant website by comparing historically what that website would have normally received in traffic during the slow or errant period.

Figure 9A:
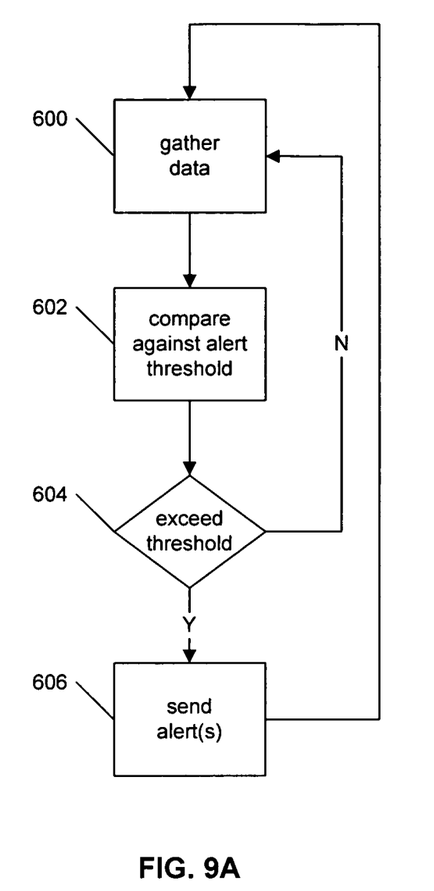
FIG. 9A is flow diagram showing an example process for gathering data from monitoring systems and processing the data for alerts according to an embodiment of the present invention.

FIG. 9A is a flow diagram showing from a high level the process of gathering data from the three monitoring systems and processing it for alerts. Data is gathered onto a computer 600 and compared against predefined thresholds 602. A decision is made 604 to determine if the data is outside of the thresholds. If it is not, then further data is gathered and the cycle continues. If it is outside the thresholds, an alert is generated to the user 606. Then the cycle repeats 600 endlessly.

Figure 9B:
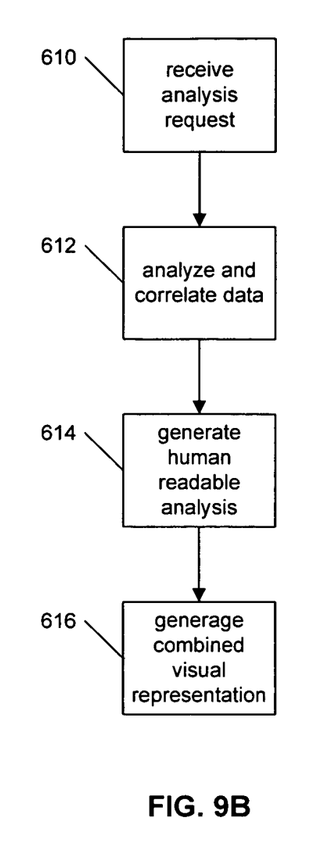
FIG. 9B is a flow diagram showing an example process of receiving requests for and generating conclusions and combined visual representations according to an embodiment of the present invention.

FIG. 9B is a flow diagram showing from a high level the process of receiving requests for and generating conclusions and visual representations. First a request for an analysis or visual representation is generated either by a request from a person or by another software program 610. Then the data is analyzed and correlated 612 (further described by FIG. 10). From the analysis and correlation, the results are compared against a set of rules and a set of conclusions are drawn and generated as human readable analysis 614. Also from the analysis and correlation a visual representation of the data is combined and generated 616.

Figure 10:
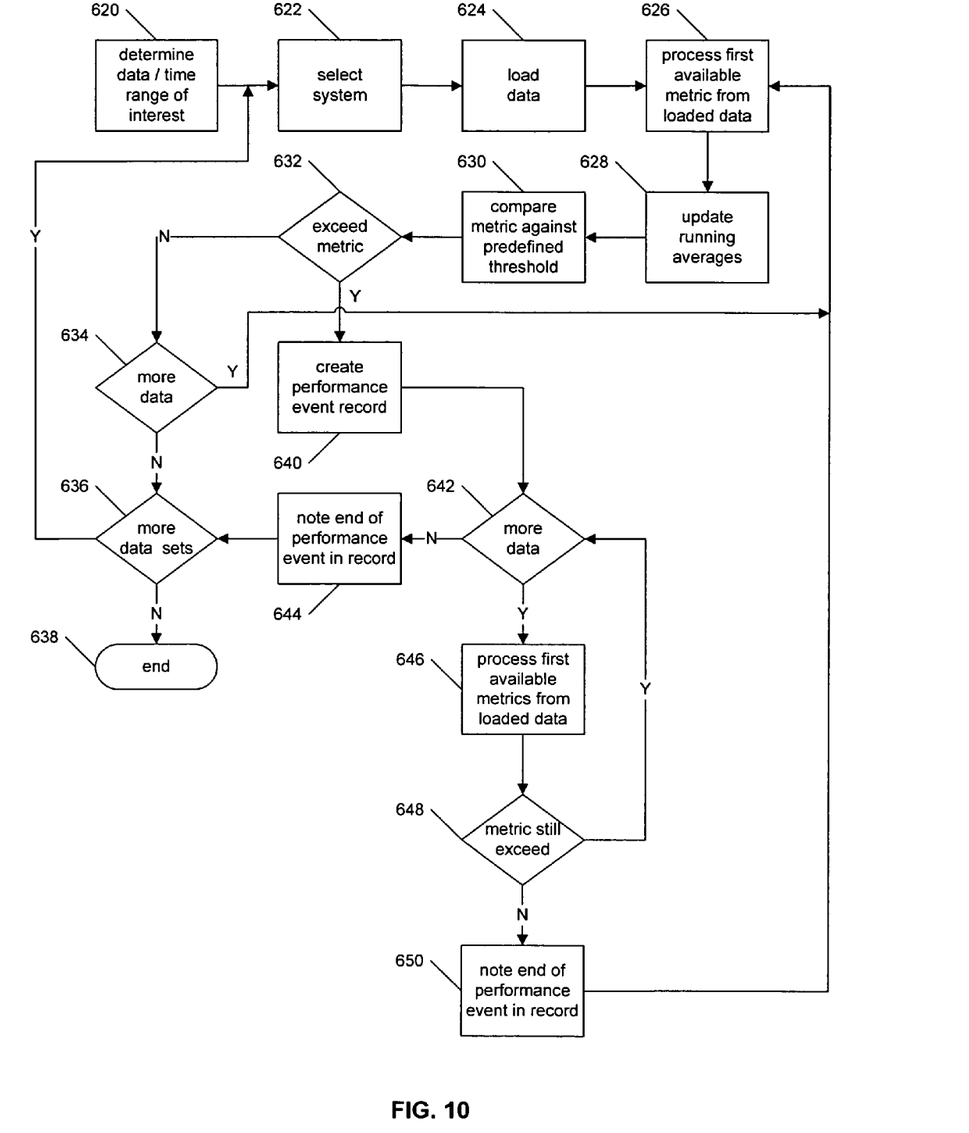
FIG. 10 is flow diagram showing an example process for analyzing data for performance events according to an embodiment of the present invention.

FIG. 10 is a flow diagram showing how data is processed and performance events are determined. Performance events are periods of time where any of the data being gathered by any of the various systems fall below or exceed predefined levels. First a period of time of interest is determined 620. Then one of the datasets from the disparate systems is selected to start with 622 that hasn't already been processed to do the analysis on. The data is loaded into memory 624 and each piece 626 of data (representative of a metric) is added to running averages 628 and compared against known thresholds 630. If the data is outside predefined thresholds, 632 then a performance event has started 640. If not, we check to see if there is more data to analyze 634. If there is, we go back to 626. If not, we determine if there are more datasets to analyze 636. If there is not, we are done 638. If there are, we start the process over at 622. When a performance event is determined 632, we start to note the performance event information 640, the system continues to examine the data by first checking if there is more data to analyze 642 in order to determine when the performance event ends. If there is more data to analyze, another piece of data is examined 646. If the next piece of data is still outside of the range of the thresholds 648, then we go back to 642 to see if there is more data. If the new piece of data is not outside the thresholds, we update the performance event record as such 650 and return to 626 to continue to analyze further data in this dataset. Had there been no more data to analyze after the performance event had started, then the performance event would be noted as such 644 and we would check to see if there are more data sets to analyze 636. Any number of performance events may occur during any particular period. The period of data evaluated is determined by the end user and varies, typically 24 hour periods, several day periods, or even up to a week or month of data may be analyzed.

Figure 11:
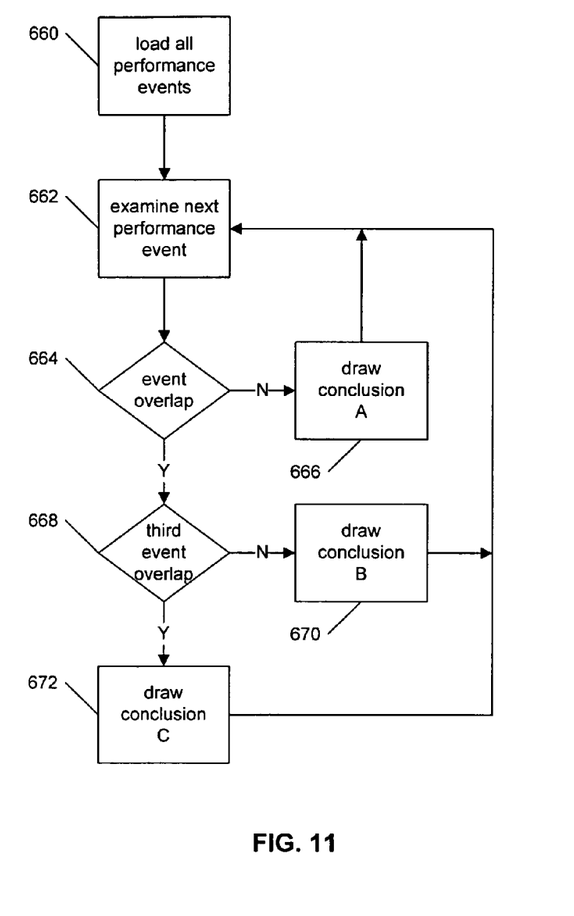
FIG. 11 is a flow diagram showing an example process for drawing intelligent conclusions by comparing overlapping or non-overlapping events according to an embodiment of the present invention.

FIG. 11 is a flow diagram showing a general procedure for applying intelligence to the set of records which identify performance events in order to draw conclusions about one set of data as it relates to another. First, all performance events are loaded 660. When the first event is examined 662 the next step is to determine if there are any overlapping events 664 which might effect or have affected the first performance event record. By overlapping we mean; for the period of time associated with the first record, there is another record whose time period overlaps this record. If there are no overlapping performance events, conclusion A can be drawn 666 and we go back to examining the next performance event. If there are two overlapping events we then check to see if there is a third overlapping event 668. If there is not, and it is just two overlapping events, conclusion B is drawn 670 and we go back to examining the next performance event 662. If there was a third overlapping event then a third conclusion, conclusion C could be drawn 672 and then we go back to examining the next performance event 662. There are many ways the logic might work out depending on the three variables, the following enumerate the possibilities.

1) There was a slow/errant website event. This was coupled with an analytics event where traffic is higher than predefined thresholds. This was coupled with an application health event. In this event, conclusion C is something to the effect: "An increase in visitor traffic has caused strain on the applications which in turn has negatively affected webpage performance".

2) There was a slow/errant website event. This was coupled with an analytics event where traffic is higher than predefined thresholds. This was NOT coupled with an application health event. In this event, conclusion B is something to the effect: "Increased traffic caused website performance to degrade, however the applications which drive the website did not seem to be effected, therefore the reason for the slowdown was due to network saturation." Note that network saturation is a metric that may not be directly monitored and its effect can be measured by monitoring every other variable that constitutes the performance of a website.

3) There was a slow/errant website event. This was NOT coupled with an analytics event, but was coupled with an application health event. Conclusion B in this case is something to the effect of "The poorly performing website was due to misbehaving applications. Traffic was not adversely effected, nor did it cause the performance problem"

4) There was a slow/errant website event. This was not coupled with an analytics event nor with an application health event. In this case conclusion A is something to the effect of: "Webpage performance degraded, however traffic was normal as was the overall health of the applications, therefore network saturation caused the performance problem".

5) There was a slow/errant website event. This was coupled with an analytics event where traffic dropped below normal levels and with an application health event. In this case, conclusion C is something to the effect of: "Website performance problems were caused by poorly performing applications which in turn caused a drop in visitors to the website"

6) There was no website event, nor analytics event. However there was an application health event. Conclusion A in this case would be something to the effect of: "Website performance is good but applications working hard, even though there is little traffic which is a concern for what will happen when traffic is high."

7) There was no website event, but there WAS an analytics event where traffic was higher than defined thresholds and there was an application health event. Conclusion B in this case would be something to the effect of: "Applications were working hard, but customers were served properly with no website performance degradation or traffic drop."

8) There was no website event, but there was an analytics event where traffic was below predefined thresholds. This was not coupled with an application health event. Conclusion A in this case would be something to the effect of: "Random customer drop-off, or marketing efforts failing which caused a drop in traffic. System health is fine."

Figure 12:
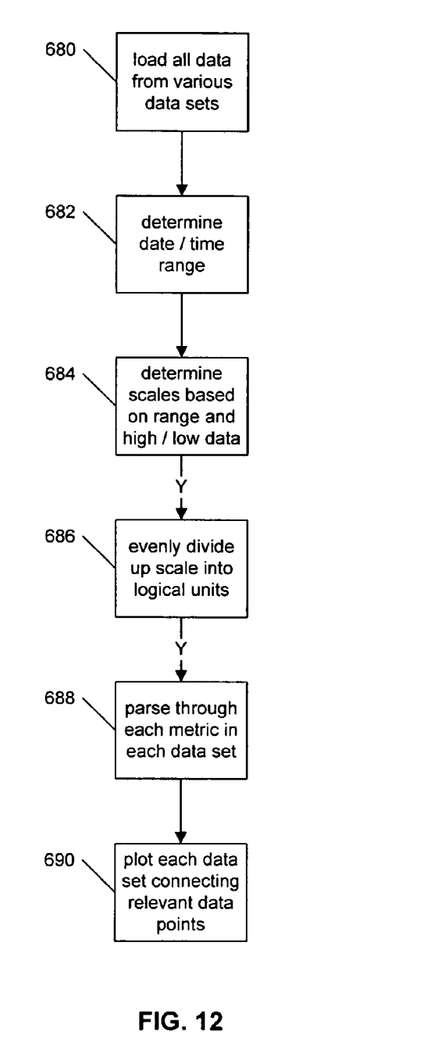
FIG. 12 is a flow diagram showing an example process for correlating and presenting various data sets on a graph according to an embodiment of the present invention.

FIG. 12 is a flow diagram describing the process of visually representing two or more datasets from website performance monitoring data and/or web analytics data and/or application health data. First all data is loaded 680, then a period of time to visually display is determined 682. Scaling is done 684 to best display the data given the high and low marks of the datasets. A logical breakup of units is determined 686, such as one unit for every hour of the day. Each metric from each dataset is parsed through and enumerated 688 and either plotted or an added to an average to be plotted for that time unit 690. Relevant metrics are connected via line graphs or other graphing methods. For example, a line would be drawn from a data point for website performance data at 9 am to a data point for website performance data at 10 am. Where applicable some metrics are summed up for the time unit and presented in total in the form of a bar which varies in height depending on the sum total of metrics for that period. For example, the number of errors a website has at 9 am would be added up and plotted as a bar. There would be no line connecting this data point to another data point, this is simply another way of graphically representing the data. When two or more datasets are plotted on the same timescale, the lines or bars will often overlap, this is not a problem. When two or more datasets are plotted on the same timescale, variations in one data set can be seen visually and should there be similar in magnitude variations in other datasets, their relationship has now been described visually.

Note that it if one dataset from website performance monitoring data, website analytics data or web application data is missing, visual comparisons from FIG. 12 can still be drawn and are still valid.

Figure 13:
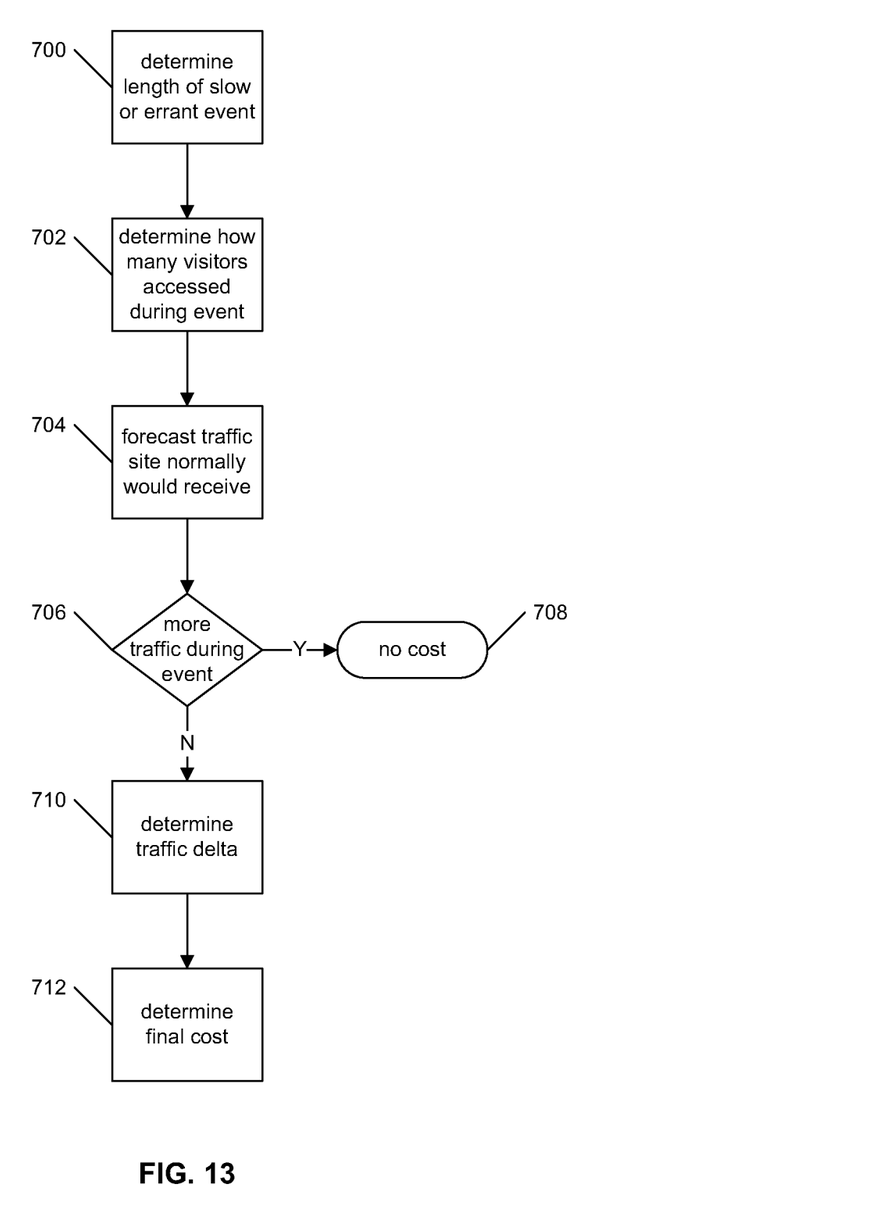
FIG. 13 is a flow diagram showing an example process for calculating the cost of a performance event according to an embodiment of the present invention.

FIG. 13 is a flow diagram showing how the cost of a slow or errant website is determined. First we determine the event length of the slow or down website 700. We then determine how many visitors the site received during that event by loading that dataset filtered by just the date/time range of the event 702. Then we forecast what the site normally would have received in terms of traffic 704 by maintaining historical visitor traffic information in our database. In virtually all cases the traffic that they did receive during the event period is much lower than what they normally receive, as determined in step 706 and we proceed to 710. We subtract the difference between the two traffic levels, this value is the "drop" or delta in traffic that they did not get 710. This drop in traffic, which is in terms of how many visitors dropped off is multiplied by a value per visitor dollar value that the customer specified to determine the cost of the event 712. Had there been an equal or more traffic during the event 706, there would be no cost to the event and we would stop 708.

Figure 14:
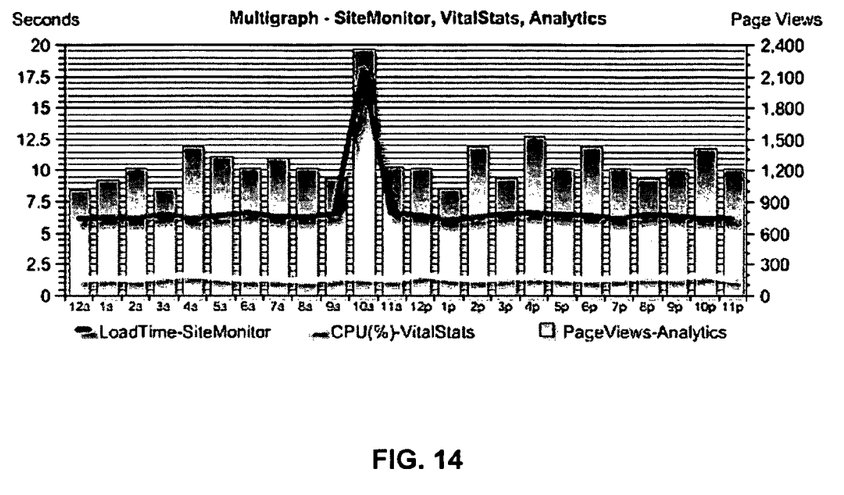
FIG. 14 is a graph diagram illustrating an example presentation of web analytics data combined with web performance data according to an embodiment of the present invention.

FIG. 14, as it relates to the process described in FIG. 12, is a graph diagram of example web analytics data visually combined with web performance data and application health data. Particularly of interest is the effect of a spike in traffic (analytics) on web performance.

Figure 15:
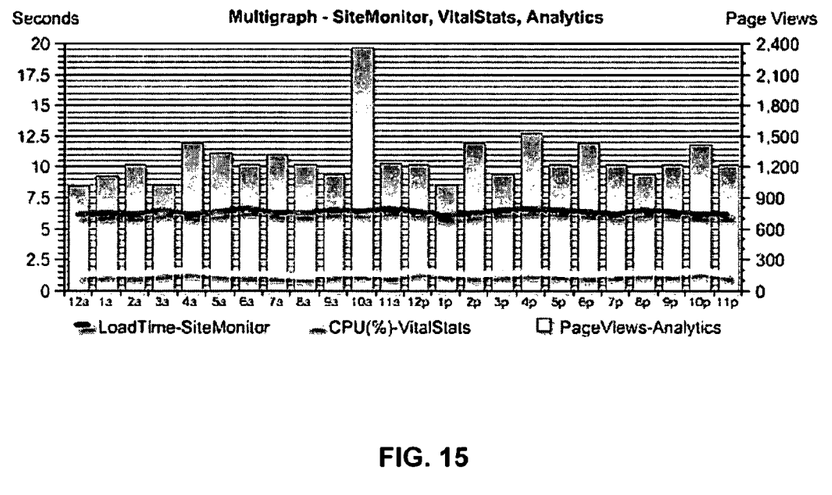
FIG. 15 is a graph diagram illustrating an example presentation of web performance data combined with application health data according to an embodiment of the present invention.

FIG. 15, as it relates to the process described in FIG. 12, is a graph diagram of example web analytics data visually combined with web performance data and application health data. Particularly of interest is the analytics event and its lack of effect on web performance and application health. An example of a situation which is not a problem.

Figure 16:
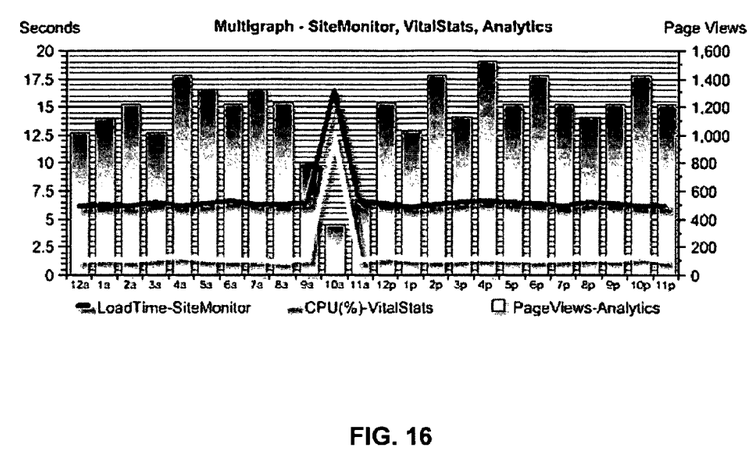
FIG. 16 is a graph diagram illustrating an example presentation of web application health data correlated to web analytics data according to an embodiment of the present invention.

FIG. 16, as it relates to the process described in FIG. 12, is a graph diagram of example web analytics data visually combined with website performance data and application health data. Particularly of interest is the application health spike (in this case operating system health—CPU usage) and its corresponding effect on website performance and website traffic.

Figure 17:
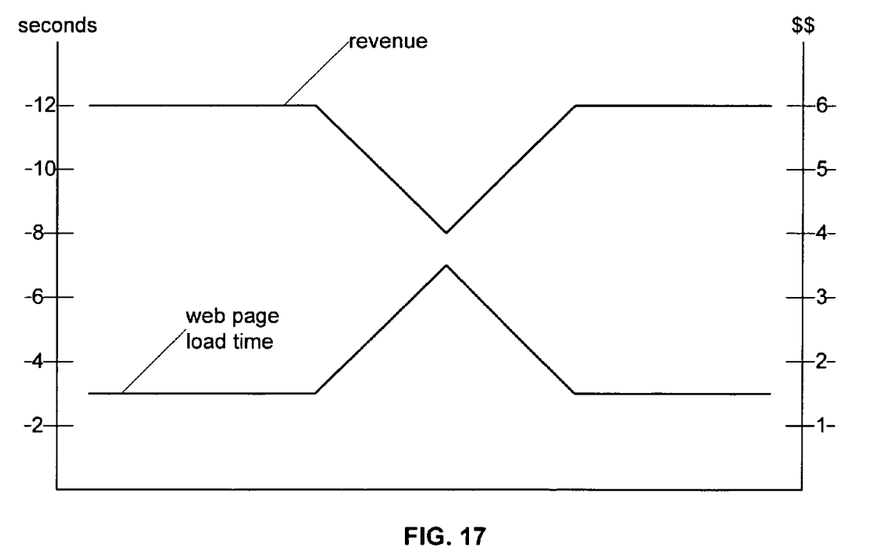
FIG. 17 is a graph diagram illustrating an example presentation of web performance data combined with website revenue data according to an embodiment of the present invention.

FIG. 17 as it relates to the process described in FIG. 12, is a graph diagram of example web analytics data visually combined with website performance data in order to draw conclusions about the cost of a slow website or inaccessible website. The web analytics system 110 tracks how much money the website is generating (or the value of all the visits) on periodic basis, such as a second by second, minute by minute, hour by hour or day by day basis. This can be graphed visually as revenue (or value) per hour of day or revenue by day of week. The correlation system 30 combines this with the performance system 100 data which visually correlates the effect on revenue (or value of visitors) of a slow website or inaccessible website.

Figure 18:
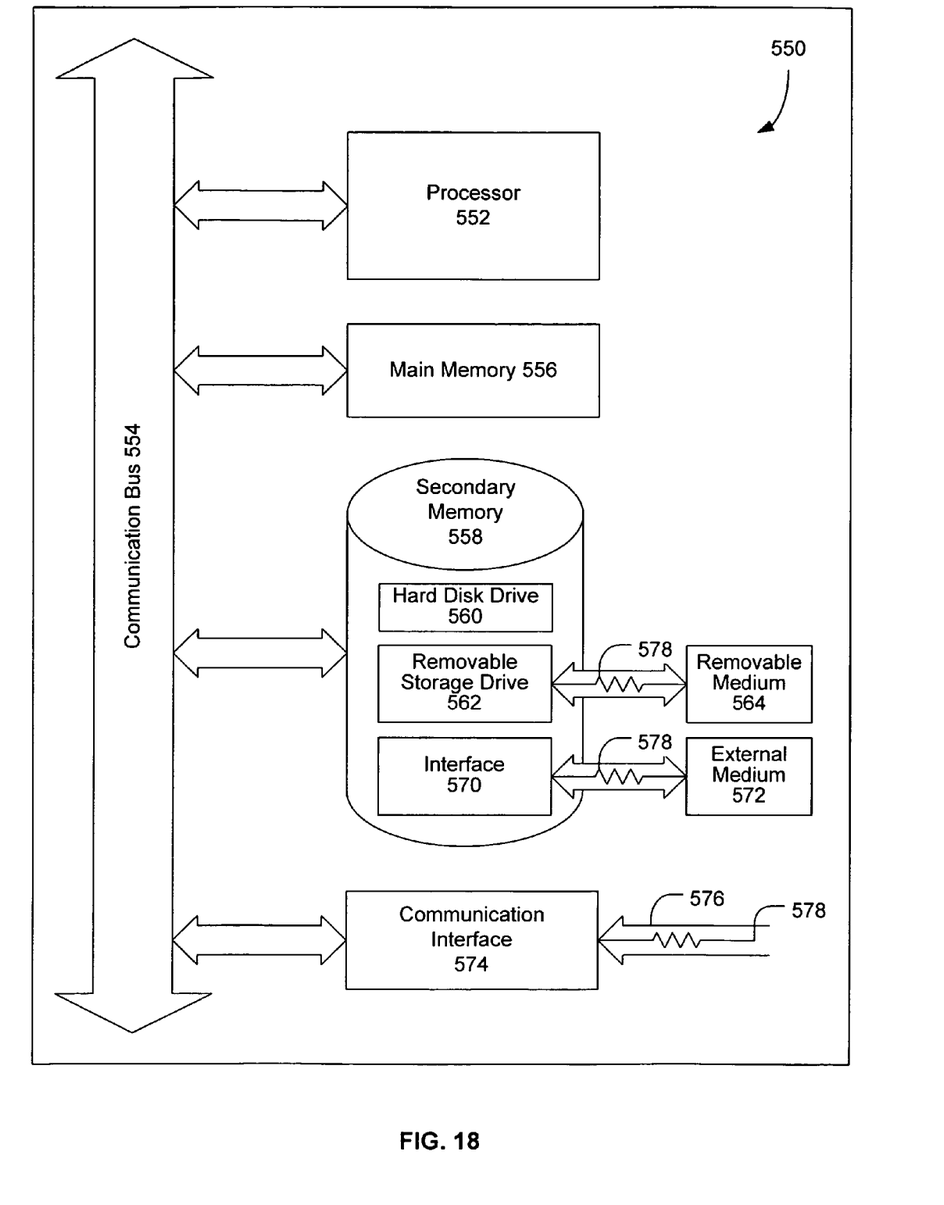
FIG. 18 is a block diagram illustrating an exemplary computer system as may be used in connection with various embodiments described herein.

FIG. 18 is a block diagram illustrating an exemplary computer system 550 that may be used in connection with the various embodiments described herein. For example, the computer system 550 may be used in conjunction with a web server or a correlation server. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable storage medium" is used to refer to any media used to provide computer executable code (e.g., software and computer programs) to the computer system 550. Examples of these storage media include main memory 556, secondary memory 558 (including hard disk drive 560, removable storage medium 564, and external storage medium 572), and any peripheral device communicatively coupled with communication interface 574 (including a network information server or other network device). These computer readable storage mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A computer implemented system for monitoring and correlating information related to website performance, analytics, and health, the system comprising:

a performance system that monitors the performance of a website via a data communication network and stores performance related information in a computer readable medium, the performance system comprising a data gatherer in communication with a remote monitoring agent via the data communication network, wherein the data gatherer receives performance related information from said remote monitoring agent;

an analytics system that monitors visitor traffic to the website via the data communication network and stores traffic related information in the data storage area;

an application health system that monitors the status of applications hosted by the website via a data communication network and stores application health related information in the data storage area;

a correlation system that accesses the performance, traffic, and health related information stored in the data storage area, the correlation system comprising an expert system that analyzes the performance, traffic, and health related information to identify two or more performance events, wherein each performance event has an associated time period and applies a rule set to the analyzed information to identify correlations between performance and traffic information, performance and health information, and traffic and health information;

wherein the identified correlations comprise conclusions in cause and effect format based on performance events having overlapping time periods; and wherein the correlation system provides a visual representation of the identified correlations on a display.

2. The system of claim 1, wherein the expert system further operates to determine that a variation in website performance was caused by a variation in website traffic.

3. The system of claim 1, wherein the expert system further operates to determine that a variation in website performance was caused by a variation in website application health.

4. The system of claim 1, wherein the expert system further operates to determine that a variation in website traffic was caused by a variation in website application health.

5. The system of claim 1, wherein the expert system further operates to determine that a variation in website traffic was caused by a variation in website performance.

6. The system of claim 1, wherein the expert system further operates to determine that a variation in website application health was caused by a variation in website performance.

7. The system of claim 1, wherein the expert system further operates to determine that a variation in website application health was caused by a variation in website traffic.

8. The system of claim 1, wherein the expert system further operates to determine the cost of identified correlations.

9. The system of claim 8, wherein the determined cost is based on a predetermined value of a user visit to the website.

10. A computer implemented method for monitoring and correlating information related to website performance, analytics, and health, comprising:
- monitoring the performance of a website via a data communication network by receiving performance data from a remote monitoring agent via the data communication network and storing performance related information in a computer readable data storage area;
- monitoring visitor traffic to the website via a data communication network and storing traffic related information in the data storage area;
- monitoring the status of applications hosted by the website via a data communication network and storing application health related information in the data storage area;
- analyzing the performance, traffic, and health related information in the data storage area to identify two or more performance events, wherein each performance event has an associated time period and to identify correlations between performance and traffic information, performance and health information, and traffic and health information, and to identify conclusions in cause and effect format based on performance events having overlapping time periods; and
- providing a visual representation of the identified correlations on a display.

11. The method of claim 10, further comprising determining the cost of the identified correlations.

12. The method of claim 11, wherein the determined cost is based on a predetermined value of a user visit to the website.

13. The method of claim 12, wherein the predetermined value is provided via a user-interface questionnaire.

14. The method of claim 10, wherein the visual representation comprises a graph including at least performance and traffic information.

15. The method of claim 10, wherein the visual representation comprises a graph including at least performance and health information.

16. The method of claim 10, wherein the visual representation comprises a graph including at least traffic and health information.

17. A computer readable storage media including one or more computer readable storage mediums having stored thereon one or more sequences of instructions for causing one or more microprocessors to perform the steps for determining a cost associated with website performance, the steps comprising:
- monitoring the performance of a website via a data communication network by receiving performance data from a remote monitoring agent via the data communication network and storing performance related information in a computer readable data storage area;
- monitoring visitor traffic to the website via a data communication network and storing traffic related information in the data storage area;
- monitoring the status of applications hosted by the website via a data communication network and storing application health related information in the data storage area;
- analyzing the performance, traffic, and health related information in the data storage area to identify two or more performance events, wherein each performance event has an associated time period and to identify correlations between performance and traffic information, performance and health information, and traffic and health information; and
- identifying cause and effect conclusions based on performance events having overlapping time periods.

* * * * *